No. 40,650.
PATENTED NOV. 17, 1863.

A. & I. STRAUB.
ARTIFICIAL VARIEGATED MARBLE.

Witnesses:

Inventor:
Abraham Straub and
Isaac Straub

UNITED STATES PATENT OFFICE.

ABRAHAM STRAUB, OF MILTON, PENNSYLVANIA, AND ISAAC STRAUB, OF CINCINNATI, OHIO.

IMPROVED ARTIFICIAL VARIEGATED MARBLE.

Specification forming part of Letters Patent No. 40,650, dated November 17, 1863.

*To all whom it may concern:*

Be it known that we, ABRAHAM STRAUB, of Milton, Northumberland county, State of Pennsylvania, and ISAAC STRAUB, of Cincinnati, in the county of Hamilton and State of Ohio, have invented a new and useful Sea-Shell or Ornamental Marble; and we do hereby declare that the following is a full, clear, and exact description thereof, reference being had to the accompanying drawings, making a part of this specification, in which—

Figure 1:
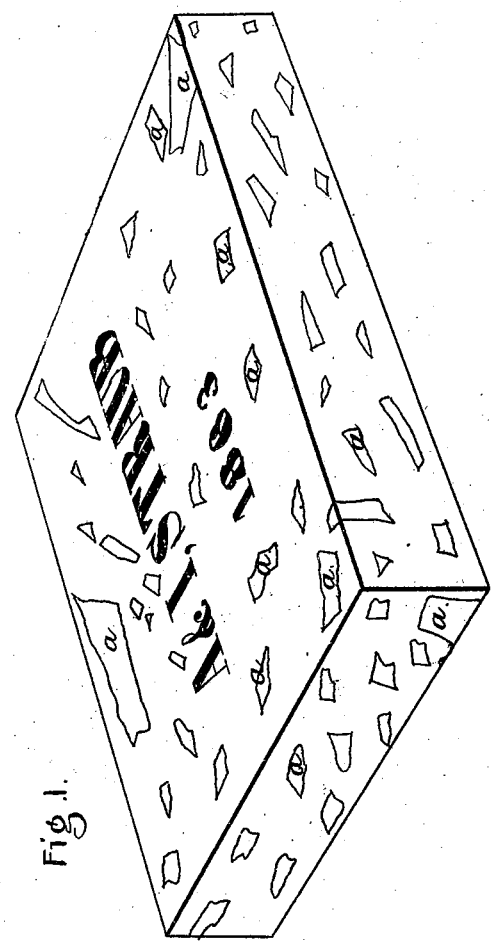
Figure 2:
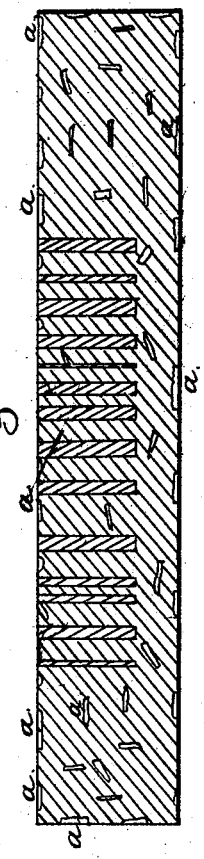

Figure 1 is a perspective view of a block of our new marble. Fig. 2 is a sectional view of Fig. 1.

Similar letters of reference indicate corresponding parts in the two figures.

This invention has for its object the production of an artificial marble having a dark or black ground interspersed with light-colored substances.

The invention consists in a cement composed of asphaltum and shale-rock, mixed with mother-of-pearl, bones, and other like substances, which will give a variegated appearance to the conglomerate, as will be hereinafter described.

The following is a description of the new marble and the mode of making it.

In a suitable vessel we introduce one part of mineral tar and boil this tar until it has given off the greater portion of the naphtha. We then add to this boiling tar an equal proportion of very dry and finely-pulverized shale-rock, thus making a cement which constitutes the basis of the new marble. Into this cement we introduce in considerable quantities small pieces of mother-of-pearl, bone, and other similar substances, which are intended to give a variegated appearance to the surfaces of the molded and finished blocks.

The mass should be thoroughly stirred, so that the colored substances last introduced will be thoroughly intermixed with the cement; and when the mass has been properly heated and mixed, it is poured into molds of any desirable form and set away to cool and to solidify, after which the solid blocks are removed from the molds, ground down, and polished. In the polished surface will be seen firmly embedded the different substances which were last introduced into the boiling mass, and the variety of colors and shapes of these substances will give to the blocks a very handsome appearance.

The drawings represent one of these blocks having the substances *a a a* interspersed over its surface. We also represent letters in this block to show that letters or characters of any description may be embedded in the blocks either by introducing them into the mixture before it has cooled or by setting them up in the molds and pouring the mixture around them. We propose to use pieces of sea-shell or small, unbroken shells, and, indeed, any kind of substance which will receive a polished surface and give a handsome appearance to the blocks.

We claim as a new article of manufacture—

The sea-shell or ornamental marble composed of the ingredients united substantially in the proportions herein set forth.

Witness our hands in the matter of our application for a patent for an improved ornamental concrete.

A. STRAUB.
      ISAAC STRAUB.

Witnesses:
 R. T. CAMPBELL.
 E. SCHAFER.